Sept. 16, 1941.  B. H. CALDWELL, JR  2,256,239
DYNAMO-ELECTRIC MACHINE
Filed Oct. 25, 1939
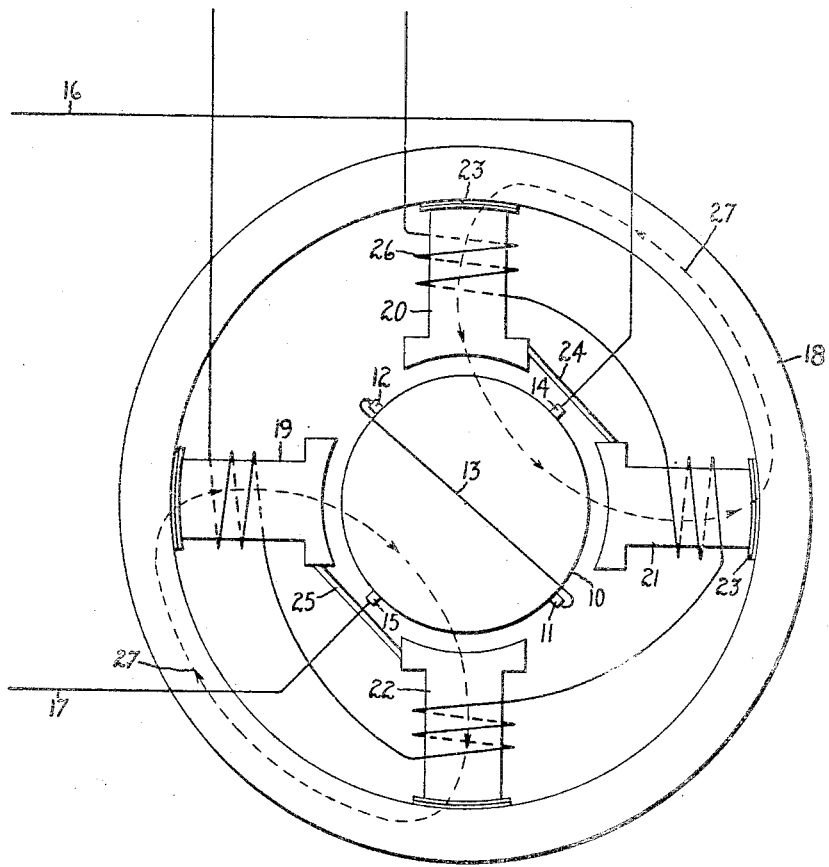
Inventor:
Bascom H. Caldwell Jr;
by Harry E. Dunham
His Attorney Patented Sept. 16, 1941

2,256,239

UNITED STATES PATENT OFFICE 2,256,239

DYNAMOELECTRIC MACHINE

Bascom H. Caldwell, Jr., Schenectady, N. Y., assignor to General Electric Company, a corporation of New York Application October 25, 1939, Serial No. 301,256

10 Claims. (Cl. 171—227)

This invention relates to direct-current commutator type dynamo-electric machines, and particularly to the magnetic field structure of a machine of this type which utilizes armature reaction as the main source of excitation.

A direct-current machine of the armature reaction excitation type is a dynamo-electric machine which may be operated as a motor, a generator, or a rotary transformer, and is provided with a rotor or armature having a winding and a commutator of the conventional direct-current dynamo-electric machine type. The stationary member of such a machine usually is arranged to provide a path of low magnetic reluctance to the magnetic flux set up by the armature currents and may be provided with various windings to improve or control the operation of the machine. The basic principle of operation of such a machine is similar to that of the Rosenberg generator in that it depends upon armature reaction flux produced by current flowing between two sets of brushes for providing the desired characteristics of the machine. In such machines, the stationary magnetic field structure usually is provided with a plurality of pole pieces, each of which is arranged to carry a component of flux produced by current flowing in the armature and through a set of short-circuit brushes. This armature circuit may be considered as corresponding to the primary circuit of the transformer, and this component of flux as the primary flux of the machine. These same pole pieces also are arranged to carry a component of flux produced by an electric current flowing in the armature between another set of brushes which is connected to a load circuit if the machine is a generator or a rotary transformer. This load current and component of flux correspond to the secondary current and secondary flux of a conventional transformer, and therefore, may be considered as a secondary flux and as current flowing through a secondary circuit of the armature. The primary armature circuit of such a machine may be completed through a short-circuit set of primary brushes which are electrically displaced about the commutator from the secondary or load brushes of the machine. With such an arrangement, it has been found that substantially full rated voltage of the machine may be generated between the secondary brushes of the machine on open circuit with no load connected to the secondary brushes, as a relatively high exciting or primary current will flow between the short-circuit brushes even with a relatively small component of excitation, such as may be provided by the residual magnetism of the magnetic field structure through the primary poles of the machine. In certain instances, this is found to be undesirable, as the open circuit secondary voltage may be excessively high under these conditions.

An object of my invention is to provide an improved dynamo-electric machine of the armature reaction excitation type with an arrangement for regulating the effect of residual magnetic excitation from the primary poles of the machine.

Another object of my invention is to provide an improved field structure for a dynamo-electric machine of the above type provided with an arrangement for minimizing the effect of residual magnetic excitation of the field structure along the primary poles of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

The single figure of the drawing illustrates an armature reaction dynamo-electric machine provided with my improved stationary magnetic field structure.

Referring to the drawing, I have shown a dynamo-electric machine of the armature reaction type provided with a rotatable member or armature 10 having an armature winding and a commutator connected thereto. A set of primary brushes 11 and 12 is arranged about the commutator substantially 180 electrical degrees apart, and these brushes are connected together by a short-circuiting conductor 13 to complete a primary circuit through the winding of the armature 10. A set of secondary brushes 14 and 15 is arranged displaced about the commutator substantially 90 electrical degrees from the primary brush set, and these brushes are connected to conductors 16 and 17 which are adapted to supply current to a secondary or load circuit.

The machine is provided with a stationary magnetic field structure which includes a frame 18 of magnetic material and a plurality of pole pieces 19, 20, 21, and 22 arranged in circumferentially spaced apart relation about the armature 10. These pole pieces are formed of magnetic material and are secured to the stationary member frame 18 in any suitable manner, as by bolting or riveting thereto, preferably by non-magnetic bolts or rivets. Generally, this type machine is similar to a Rosenberg dynamo-electric machine, and therefore, each pole piece is arranged to carry a component of flux for the primary circuit of the armature and a component of flux for the secondary circuit of the armature. Thus, each pole piece is adapted to be included in a primary pole and in a secondary pole of the stationary member of the machine. The pole pieces are arranged so that adjacent poles form pairs of pole pieces providing either a primary pole or a secondary pole for the stationary member of the machine, and the effective component of flux for the respective pole is substantially the same in the two pole pieces forming any particular pole for the machine. As shown in the drawing, the pole pieces 19 and 20 form a pair of pole pieces providing a primary pole for the machine, the axis of which is substantially along the line intermediate these two pole pieces, and the pole pieces 21 and 22 form another pair of pole pieces providing another primary pole to the machine having the same axis as the pole formed by the pole pieces 19 and 20. With such an arrangement, it has been found that the residual magnetomotive force of the stationary member of the machine may provide an undesirably high secondary voltage on open circuit.

In order to minimize the effect of residual magnetism upon the operation of the machine, I provide non-magnetic shim elements 23 between each of the pole pieces and the frame 18, so as to form an effective air gap in the magnetic circuit of the stationary member and thereby increase its reluctance. In order further to decrease the effect of residual magnetism upon the winding of the rotatable member 10, I provide shunts 24 and 25 between the pole pieces 20 and 21, and 19 and 22, respectively. These shunts are formed of magnetic material and are proportioned so as to be substantially saturated by the residual magnetic excitation of the stationary member acting between the respective pairs of pole pieces to which they are connected. By arranging these magnetic shunts between pole pieces of pairs of pole pieces forming secondary poles for the machine, the residual magnetic excitation along the primary poles of the machine is shunted therethrough. In this manner, substantially no residual magnetic excitation is provided to the winding of the rotatable member 10 along the primary pole axis of the machine, and therefore, substantially no voltage will be generated in the primary circuit of the rotatable member by residual magnetic excitation of the stationary member. In this manner, it is possible more readily to control the characteristics of the machine, and the open-circuit secondary voltage of the machine may be varied or controlled by a field exciting winding 26 arranged on the pole pieces 19, 20, 21, and 22, which can provide a primary control flux as indicated by the arrows 27. Since the shunts 24 and 25 are adapted to carry the residual magnetic excitation of the machine and to shunt this flux between adjacent pole pieces forming adjacent primary poles of opposite polarity and to be substantially saturated by this residual flux, they will carry substantially no control field excitation and will have substantially no effect upon the excitation provided by the control field exciting winding 26. In this manner, I provide an improved dynamo-electric machine of the armature reaction excitation type having an improved magnetic excitation structure which provides an arrangement for more readily controlling the operating characteristics of the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is,

1. A magnetic field structure for a dynamo-electric machine having a rotatable member with a winding and a commutator connected thereto with sets of primary commutator brushes and secondary commutator brushes electrically displaced from each other about the commutator for providing a primary circuit and a secondary circuit through the rotatable member winding, which includes a plurality of pole pieces each arranged to carry a primary and a secondary component of magnetic excitation to form primary poles of certain pairs of adjacent pole pieces, adjacent pole pieces of different primary poles being arranged to form pairs of pole pieces providing secondary poles, and means for substantially shunting therethrough residual magnetic excitation along said primary poles.

2. A magnetic field structure for a dynamo-electric machine having a rotatable member with a winding and a commutator connected thereto with sets of primary commutator brushes and secondary commutator brushes electrically displaced from each other about the commutator for providing a primary circuit and a secondary circuit through the rotatable member winding, which includes a plurality of pole pieces each arranged to carry a primary and a secondary component of magnetic excitation to form primary poles of certain pairs of adjacent pole pieces, adjacent pole pieces of different primary poles being arranged to form pairs of pole pieces providing secondary poles, and means including a magnetic shunt arranged between pole pieces of said pairs of pole pieces forming secondary poles for substantially shunting therethrough residual magnetic excitation along said primary poles.

3. A magnetic field structure for a dynamo-electric machine including a plurality of pole pieces each arranged to carry a primary and a secondary component of magnetic excitation to form primary poles of certain pairs of adjacent pole pieces, adjacent pole pieces of different primary poles being arranged to form pairs of pole pieces providing secondary poles, and means including a magnetic shunt substantially saturated by residual magnetic excitation of said magnetic field structure arranged between adjacent pole pieces of said pairs of pole pieces forming secondary poles for regulating the effect of residual magnetic excitation from said primary poles.

4. A magnetic field structure for a dynamo-electric machine including a plurality of pole pieces each arranged to carry a primary and a secondary component of magnetic excitation to form primary poles of certain pairs of adjacent pole pieces, adjacent pole pieces of different primary poles being arranged to form pairs of pole pieces providing secondary poles, means for increasing the reluctance of said magnetic field structure, and means for minimizing the effect of residual magnetic excitation of said field structure along said primary poles.

5. A magnetic field structure for a dynamo-electric machine including a plurality of pole pieces each arranged to carry a primary and a secondary component of magnetic excitation to form primary poles of certain pairs of adjacent pole pieces, adjacent pole pieces of different primary poles being arranged to form pairs of pole pieces providing secondary poles, means including a non-magnetic element arranged in the magnetic circuit of said field structure to provide an effective air gap therein for increasing the reluctance thereof, and means for minimizing the effect of residual magnetic excitation of said field structure along said primary poles.

6. A dynamo-electric machine including a rotatable member having a winding, a commutator connected to said winding, means including a set of short-circuited primary brushes for providing a primary circuit through said winding and a set of secondary brushes electrically displaced from said primary brushes about said commutator for providing a secondary circuit through said winding, a magnetic field structure including a plurality of pole pieces each adapted to carry a component of excitation for said primary circuit and a component of excitation for said secondary circuit, certain pairs of adjacent pole pieces of said pole pieces being arranged to form poles for said primary circuit and adjacent pole pieces of different adjacent primary poles being arranged to form poles for said secondary circuit, and means for substantially shunting therethrough residual magnetic excitation along said primary circuit poles.

7. A dynamo-electric machine including a rotatable member having a winding, a commutator connected to said winding, means including a set of short-circuited primary brushes for providing a primary circuit through said winding and a set of secondary brushes electrically displaced from said primary brushes about said commutator for providing a secondary circuit through said winding, a magnetic field structure including a plurality of pole pieces each adapted to carry a component of excitation for said primary circuit and a component of excitation for said secondary circuit, certain pairs of adjacent pole pieces of said pole pieces being arranged to form poles for said primary circuit and adjacent pole pieces of different adjacent primary poles being arranged to form poles for said secondary circuit, means for increasing the magnetic reluctance of said magnetic field structure, and means for regulating the effect of residual magnetic excitation of said field structure along said primary circuit poles.

8. A dynamo-electric machine including a rotatable member having a winding, a commutator connected to said winding, means including a set of primary brushes and a set of secondary brushes electrically displaced from said primary brushes about said commutator for providing a primary circuit and a secondary circuit respectively through said rotatable member winding, a magnetic field structure including a plurality of pole pieces each adapted to carry a component of excitation for said primary circuit and a component of excitation for said secondary circuit, pairs of adjacent pole pieces of said pole pieces being arranged to form poles for said primary circuit and adjacent pole pieces of adjacent pairs of said pairs of pole pieces being arranged to form poles for said secondary circuit, and means including a magnetic shunt between pole pieces of said pole pieces forming said secondary poles for substantially shunting residual magnetic excitation from said rotatable member along said primary circuit poles.

9. A dynamo-electric machine including a rotatable member having a winding, a commutator connected to said winding, a set of primary brushes and a set of secondary brushes electrically displaced from said primary brushes about said commutator to provide a primary circuit and a secondary circuit respectively through said rotatable member winding, a magnetic field structure including a plurality of pole pieces each adapted to carry a component of excitation for said primary circuit and a component of excitation for said secondary circuit, pairs of adjacent pole pieces of said pole pieces being arranged to form poles for said primary circuit displaced substantially 180 electrical degrees apart and adjacent pole pieces of adjacent pairs of said pairs of pole pieces being arranged to form poles for said secondary circuit, and means including a magnetic shunt substantially saturated by residual magnetism of said magnetic field structure arranged between adjacent pole pieces of said pole pieces forming said secondary poles for regulating the effect of residual magnetic excitation from said primary circuit poles on said rotatable member winding.

10. A dynamo-electric machine including a rotatable member having a winding, a commutator connected to said winding, means including a set of primary brushes and a set of secondary brushes electrically displaced from said primary brushes about said commutator for providing a primary circuit and a secondary circuit respectively through said winding, a magnetic field structure including a plurality of pole pieces each adapted to carry a component of excitation for said primary circuit and a component of excitation for said secondary circuit, pairs of adjacent pole pieces of said pole pieces being arranged to form poles for said primary circuit and adjacent pole pieces of adjacent pairs of said pairs of pole pieces being arranged to form poles for said secondary circuit, and means for regulating the effect of residual magnetic excitation of said field structure from said primary circuit poles of said rotatable member.

BASCOM H. CALDWELL, JR.